Patented Feb. 9, 1943

2,310,223

UNITED STATES PATENT OFFICE 2,310,223

LIQUID HARDENER SOLUTION

George T. Eaton and John I. Crabtree, Rochester, N. Y., assignors to Eastman Kodak Company, Rochester, N. Y., a corporation of New Jersey No Drawing. Application August 19, 1941, Serial No. 407,452

18 Claims. (Cl. 95—88)

This invention relates to hardening and hardening-fixing solutions for treatment of synthetic resins in photographic processes.

Emulsions containing the customary ingredients such as light-sensitive silver salts, sensitizers, etc., but having a synthetic vehicle in place of gelatin, are not satisfactorily processed in the solutions recommended for the conventional gelatin emulsions. These emulsions having synthetic vehicles are developed satisfactorily as to speed, contrast, tone, etc., and may be fixed normally in conventional developers and fixing baths but do not have a sufficient degree of hardness to allow processing in solutions above 70° F. nor do they allow ferrotyping on the drum type of a ferrotyping machine.

Vehicles such as polyvinyl alcohol and similar resins are not effectively hardened in preliminary hardening baths, hardening stop baths, or hardening-fixing baths containing the usual hardeners, such as potassium alum, chrom alum, and formaldehyde.

In the Wadman and Hurd U. S. patent application Serial No. 385,964 filed March 29, 1941, it is disclosed that zirconium salts may be used to harden emulsions containing a gelatin vehicle.

We have found that zirconium salts also satisfactorily harden synthetic resin vehicles, and in fact, constitute in some cases the only hardening agent known for some resin vehicles. The zirconium compounds consisting of zirconium and a cation such as an alkali metal, ammonia or a lower aliphatic amine in the presence of sulfate, nitrate or similar anions, are effective. The zirconium salts or salt mixtures may be used in baths to harden the resin emulsion before exposure, immediately following development, either in a stop bath or in a fixing bath, or following fixation.

Hardening solutions of the types above may contain a single salt such as zirconium nitrate or sulfate, zirconium nitrate or sulfate and sodium acetate, zirconium nitrate or sulfate and ammonium or sodium sulfate, zirconium nitrate or sulfate and triethanolamine, and double salts such as zirconium ammonium sulfate or zirconium sodium sulfate. When sodium acetate is used in a hardening, or hardening and fixing bath, the amount used depends upon the pH of the solution required. This value may vary over a wide range.

Synthetic resin and cellulose ester vehicles which may be hardened with the zirconium compounds of the invention are the resins disclosing cellulose esters of the type disclosed in Salo U. S. 2,110,491 granted March 8, 1938, disclosing cellulose esters, and Fordyce, U. S. 2,211,323 granted August 13, 1940, disclosing acetal resins; Lowe U. S. Patents 2,286,215 granted June 16, 1942, 2,281,703 granted May 5, 1942, 2,253,078 granted August 19, 1941, and 2,276,323 granted March 17, 1942—disclosing polyvinyl alcohol, polyvinyl acetal, hydrolyzed polyvinyl ester resins.

In general the resins most effectively hardened by zirconium salts are those containing hydroxyl groups, such as are present in polyvinyl alcohol, and copolymers and heteropolymers containing combined vinyl alcohol groups. While the resins most useful in emulsions are those containing a large proportion of combined vinyl alcohol groups, resins containing a small percentage of vinyl alcohol groups are quite noticeably hardened by the zirconium compounds of the invention. We have also found that such resins need not be constituents of only emulsion layers, in order to be hardened in the manner of our invention, but they may also constitute a portion of a film such as an interlayer, backing or overcoating layer.

Examples of hardening solutions having dissolved therein zirconium simple salts or zirconium and a cation selected from a group consisting of alkali metals, ammonia and lower aliphatic amines in the presence of sulfate or other anions are given as follows:

*Example 1.*—In order to harden an unexposed vinyl alcohol containing resin vehicle emulsion, the element carrying the emulsion is bathed in a 5 per cent zirconium nitrate solution for three minutes, thereafter, in a 2 per cent ammonia solution for two minutes and finally washed for about 30 minutes.

*Example 2.*—A developed emulsion having a resin vehicle of our invention may be hardened by bathing for three to five minutes in a 5 per cent solution of zirconium nitrate followed by a fixing solution in the usual manner.

*Example 3.*—An exposed resin vehicle emulsion which has been developed, may be hardened and fixed in a bath of the following composition without any intermediate rinse bath:

| | | |
|---|---|---|
| Sodium thiosulfate | grams | 240 |
| Sodium sulfite, desiccated | do | 15 |
| Acetic acid (28 per cent) | cc | 48 |
| Boric acid, crystals | grams | 7.5 |
| Zirconium ammonium sulfate | do | 10 |
| Cold water to | liter | 1 |

*Example 4.*—The same solutions as described in Example 1 are used following fixation and washing of an exposed and developed emulsion.

*Example 5.*—Very effective hardening is obtained by using the solutions given in Examples 2 and 3, in combination, that is, treating with the bath of Example 2 followed by Example 3 bath.

*Example 6.*—An emulsion may be treated in the following solution before exposure, after development, or after fixation:

| | | |
|---|---|---|
| Zirconium nitrate | grams | 50 |
| Triethanolamine | cc | 20 |
| Water to | liters | 1 |

Similarly, emulsions containing resin vehicles other than polyvinyl alcohol, such as, acetal resins and hydrolyzed polyvinyl esters, may be hardened with the solutions shown in the above examples. Alternately, other fixing agents such as ammonium thiosulfate may be used in place of sodium thiosulfate in fixing and hardening baths of the invention. We have also found that emulsions containing partially hydrolyzed cellulose ester vehicles are hardened if acid solutions of the hardening agents are used.

While our invention is subject to other variations, it is to be understood that the disclosure herein is by way of example and that we consider as included in our invention all modifications and equivalents falling within the scope of the appended claims.

What we claim is:

1. The method of hardening a photographic resin containing vinyl alcohol groups, comprising treating the resin with a solution of a zirconium salt.

2. The method of hardening a photographic polyvinyl alcohol resin, comprising treating the resin with a solution of a zirconium double salt.

3. The method of hardening a photographic polyvinyl alcohol resin, comprising treating the resin with a solution of zirconium ammonium sulfate.

4. The method of hardening and fixing a photographic element containing silver halide in a polyvinyl alcohol resin vehicle, comprising treating the element with a solution of zirconium ammonium sulfate and a fixing agent.

5. The method of hardening and fixing a photographic element containing silver halide in a polyvinyl alcohol resin vehicle, comprising treating the element with a solution of zirconium ammonium sulfate and sodium thiosulfate.

6. The method of hardening and fixing a photographic element containing silver halide in a polyvinyl alcohol resin vehicle, comprising treating the element with a solution of zirconium nitrate, and then treating with a solution of zirconium ammonium sulfate and sodium thiosulfate.

7. The method of hardening a photographic partially hydrolyzed polyvinyl ester resin, comprising treating the resin with a solution of a zirconium double salt.

8. The method of hardening a photographic partially hydrolyzed polyvinyl ester resin, comprising treating the resin with a solution of a zirconium alkali metal double salt.

9. The method of hardening a photographic partially hydrolyzed polyvinyl ester resin, comprising treating the resin with a solution of zirconium sodium sulfate.

10. The method of hardening and fixing a photographic element containing silver halide in a partially hydrolyzed polyvinyl ester resin vehicle, comprising treating the element with a solution of zirconium sodium sulfate and a fixing agent.

11. The method of hardening and fixing a photographic element containing silver halide in a partially hydrolyzed polyvinyl ester resin vehicle, comprising treating the element in a solution of zirconium sodium sulfate and sodium thiosulfate.

12. The method of hardening a photographic acetal resin containing vinyl alcohol units, comprising treating the resin with a solution of a zirconium double salt.

13. The method of hardening a photographic acetal resin containing vinyl alcohol units, comprising treating the resin with a solution of a zirconium substituted ammonium sulfate.

14. The method of hardening a photographic acetal resin containing vinyl alcohol units, comprising treating the resin with a solution of zirconium triethanolamine sulfate.

15. The method of hardening and fixing a photographic element containing silver halide in an acetal resin vehicle containing vinyl alcohol groups, comprising treating the element with a solution of zirconium triethanolamine sulfate and a fixing agent.

16. The method of hardening and fixing a photographic element containing silver halide in an acetal resin vehicle containing vinyl alcohol groups, comprising treating the element with a solution of zirconium triethanolamine sulfate and sodium thiosulfate.

17. A hardening and fixing bath for photographic resins containing vinyl alcohol groups, comprising as the hardening agent a zirconium double salt and a fixing agent.

18. A hardening and fixing bath for photographic resins containing vinyl alcohol groups, comprising as the hardening agent zirconium ammonium sulfate and as the fixing agent sodium thiosulfate.

GEORGE T. EATON.
JOHN I. CRABTREE.